(12) United States Patent
Shumaker et al.

(10) Patent No.: US 7,736,052 B2
(45) Date of Patent: Jun. 15, 2010

(54) MULTIPOINT DIGITAL TEMPERATURE ACQUISITION SYSTEM

(75) Inventors: Brian Rafael Shumaker, Anchorage, AK (US); Nicole Yvonne Shumaker, Atlanta, GA (US); David Howard Shumaker, Hendersonville, TN (US)

(73) Assignee: BeadedStream, LLC, Anchorage, AK (US)

( * ) Notice: Subject to any disclaimer, the term of this patent is extended or adjusted under 35 U.S.C. 154(b) by 351 days.

(21) Appl. No.: 11/890,661

(22) Filed: Aug. 7, 2007

(65) Prior Publication Data
US 2009/0262781 A1  Oct. 22, 2009

Related U.S. Application Data

(60) Provisional application No. 60/837,183, filed on Aug. 11, 2006.

(51) Int. Cl.
*G01K 7/00* (2006.01)
*G01K 1/00* (2006.01)
(52) U.S. Cl. ................................ 374/170; 374/208
(58) Field of Classification Search ............ 374/208, 374/170, 152
See application file for complete search history.

(56) References Cited

U.S. PATENT DOCUMENTS 2,792,481 A * 5/1957 Wood ..................... 338/26
3,163,703 A * 12/1964 McLoad ................... 174/11 R
2003/0103547 A1 * 6/2003 Leonhardt .................... 374/25
2009/0059998 A1 * 3/2009 Hou ........................... 374/185

FOREIGN PATENT DOCUMENTS

JP          63290928 A   * 11/1988

\* cited by examiner

*Primary Examiner*—Gail Verbitsky
*Assistant Examiner*—Mirellys Jagan
(74) *Attorney, Agent, or Firm*—Wells St. John PS

(57) ABSTRACT

A digitally based system is designed to sense temperatures at a plurality of places and transmit temperature data along a hard-wire cable or distributed (wireless) network to an integrated data collection and control appliance. The system can perform single "spot" measurements or arrange multiple readings in a database for later use. Semiconductor-based sensors with digital output and data transmission capabilities allow large numbers of sensors to be placed along extended lengths of signal cable consisting of only three or four wires. The device incorporates electrical insulating materials, encapsulants, and mechanical strain relief designed to protect the sensors and transmission lines from failures related to exposure to extreme cold. Though described here for cold region applications, the embodiment of this invention encompasses moderate and tropical environments as well, or temperatures ranging from −40 C to +85 C.

11 Claims, 8 Drawing Sheets

STAR TOPOLOGY

LINEAR TOPOLOGY

Figure 1

COMBINATION STAR & LINEAR TOPOLOGY

DISTRIBUTED WIRELESS TOPOLOGY

MULTIPOINT DIGITAL TEMPERATURE ACQUISITION SYSTEM

CROSS REFERENCE TO A RELATED APPLICATION

This application claims the benefit of the filing date of Aug. 11, 2006 of Provisional Application No. 60/837,183 entitled "Multipoint Digital Temperature Acquisition System". The 60/837,183 provisional is incorporated herein by reference.

BACKGROUND OF THE INVENTION

1. Field of the Invention

The invention pertains generally to ambient air, soil, and water temperature sensing and reporting instrumentation. More specifically, the invention discloses an assembly of temperature sensor modules specially adapted for repeated and prolonged use in harsh outdoor, underground and underwater conditions, especially at low ambient temperatures (i.e. to at least −40 degrees C./F.), and designed to resist damage from mechanical stresses arising from actions on the assembly such as flexure, twisting, kinking, and tension. The invention can be provided with a standard format electrical connector for electrical association with a separate external device via a signal cable. Alternatively the invention can utilize available wireless digital communication technology to operate without hard wire connections. The temperature sensors can be placed at any position along the signal cable.

The preferred embodiment of the invention features encapsulated sensor modules with integral strain relief and robust environmental protection. The materials and methods of construction offer superior extreme low temperature performance (i.e. to at least −40 degrees C./F.) and enable the sensor elements to tolerate more coil and uncoil cycles than the prior art.

2. Background

The short cool summers and long cold winters that typify the climatic conditions found at high latitudes are conducive to the formation of permafrost or perennially frozen ground. Climatic conditions at very high latitudes also result in seasonal and multiyear ice formations on many lakes and offshore (marine) environments. Permafrost soils present unique design and construction challenges in cold regions around the world for a broad range of projects including community housing, schools, utilities, roads and bridges, airports, resource development, and defense. The occurrence of freshwater ice on inland water bodies and sea ice in the offshore realm also has ongoing relevance to commercial and academic interests focused on resource development and transportation.

Continuous records of accurate ground temperature data highly resolved with depth are required for engineering, construction, and scientific purposes on a regional, local and site specific basis. The invention addresses a need to improve the reliability and performance over previous art while achieving user cost reductions.

3. Description of Prior Art

The prior art has been known and widely used for at least three decades. The prior art accomplishes temperature measurement using a plurality of analog sensors mounted on dedicated circuits within a multiconductor signal cable. The analog sensors typically consist of thermistors, temperature sensitive resistors, which exhibit a temperature dependent resistance. A separate conductor within a cable must be allocated to each sensor although multiple sensors of this type can share a common ground. DC resistance is the measured parameter for this type of sensor. Measurements are typically accomplished in the field by connecting the leads from a conventional test meter to one dedicated circuit at a time and manually recording resistance values. Often a manual switching device is used between the test meter and multiconductor cable to improve the quality of the connections and speed of the procedure. Generic automated analog polling and data logging devices have also been used in cases where relatively few sensors are installed on a long-term basis such as under buildings or remote land-based or sea-based monitoring stations. The measured resistance is later converted to a temperature using the Hart-Steinhardt Equation with appropriate input parameters for the specific thermistor employed.

The use of thermistors for several decades has led to general acceptance of the methodology for obtaining multipoint temperature data as well as incremental improvements to the art. However, inherent limitations to the prior art persist. The signal cable must possess a separate conductor for each analog sensor plus one additional conductor to be used for ground. For applications that require many sensors, specialty signal cable with an unusually large number of conductors or more than one smaller multiconductor cable must be used to provide the required dedicated circuits. The use of cables with high numbers of conductors also increases manufacturing costs, and the cost of maintenance and repair. Large cables also tend to be heavy and inflexible for the end user who must carry, deploy, and recover the cables multiple times. The installation of analog sensors within a cable is typically completed using heat sensitive shrink materials which frequently form an unreliable seal with the outer jacket material and introduce areas of concentrated bending stress on either side of the splice area. Cold temperature failures of the outer cable jacket are common.

The invention possesses numerous benefits and advantages over known multipoint temperature sensing cables for cold regions. In particular, the invention utilizes an established digital communication protocol to reduce the number of required conductors within a cable, thereby affording lower weight and increased flexibility to the user.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION OF EMBODIMENTS OF THE INVENTION

Figure 1:
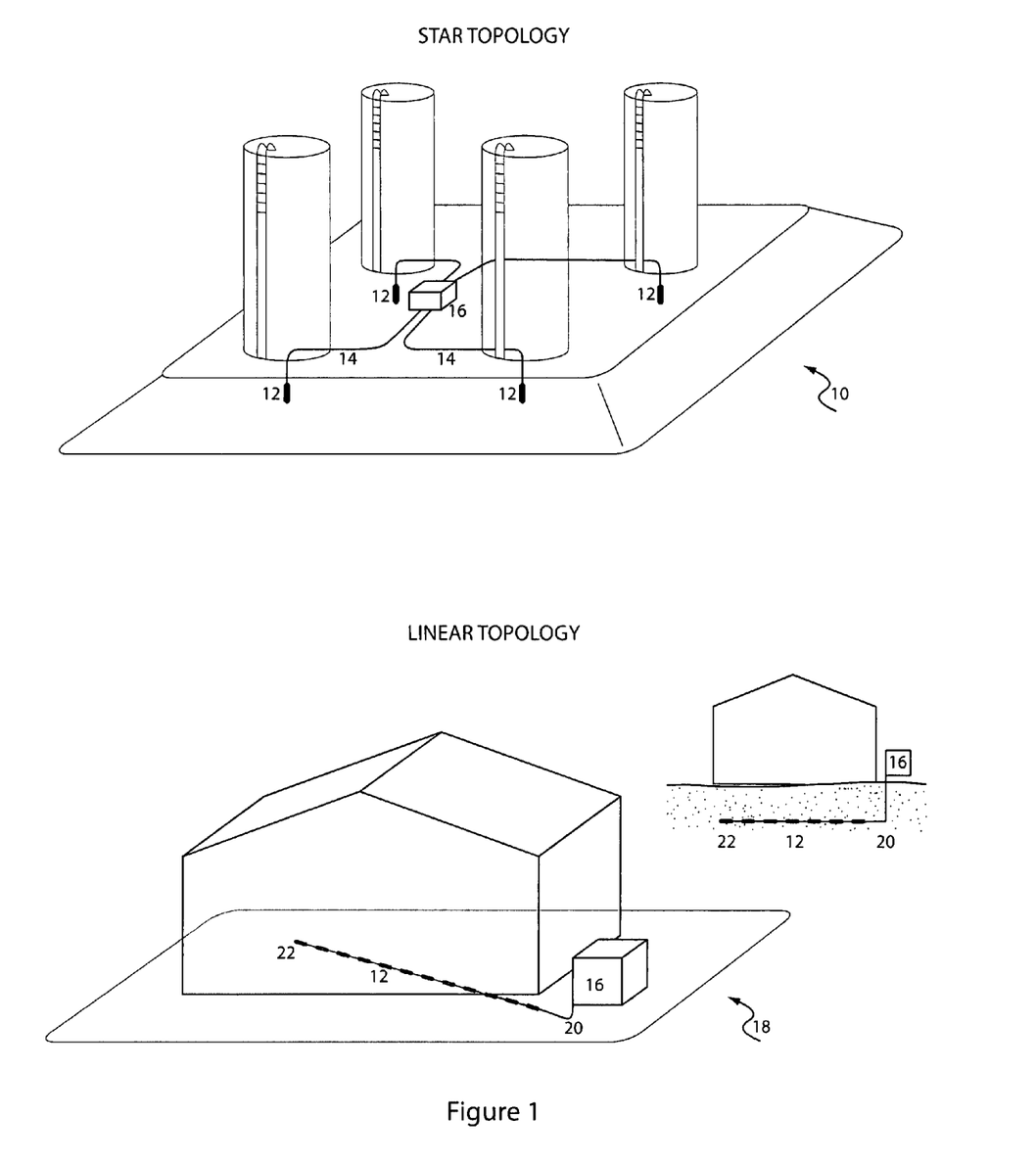
FIG. 1 depicts various hard-wired network topologies within arbitrary landscapes in which this invention could be used.
Figure 2:
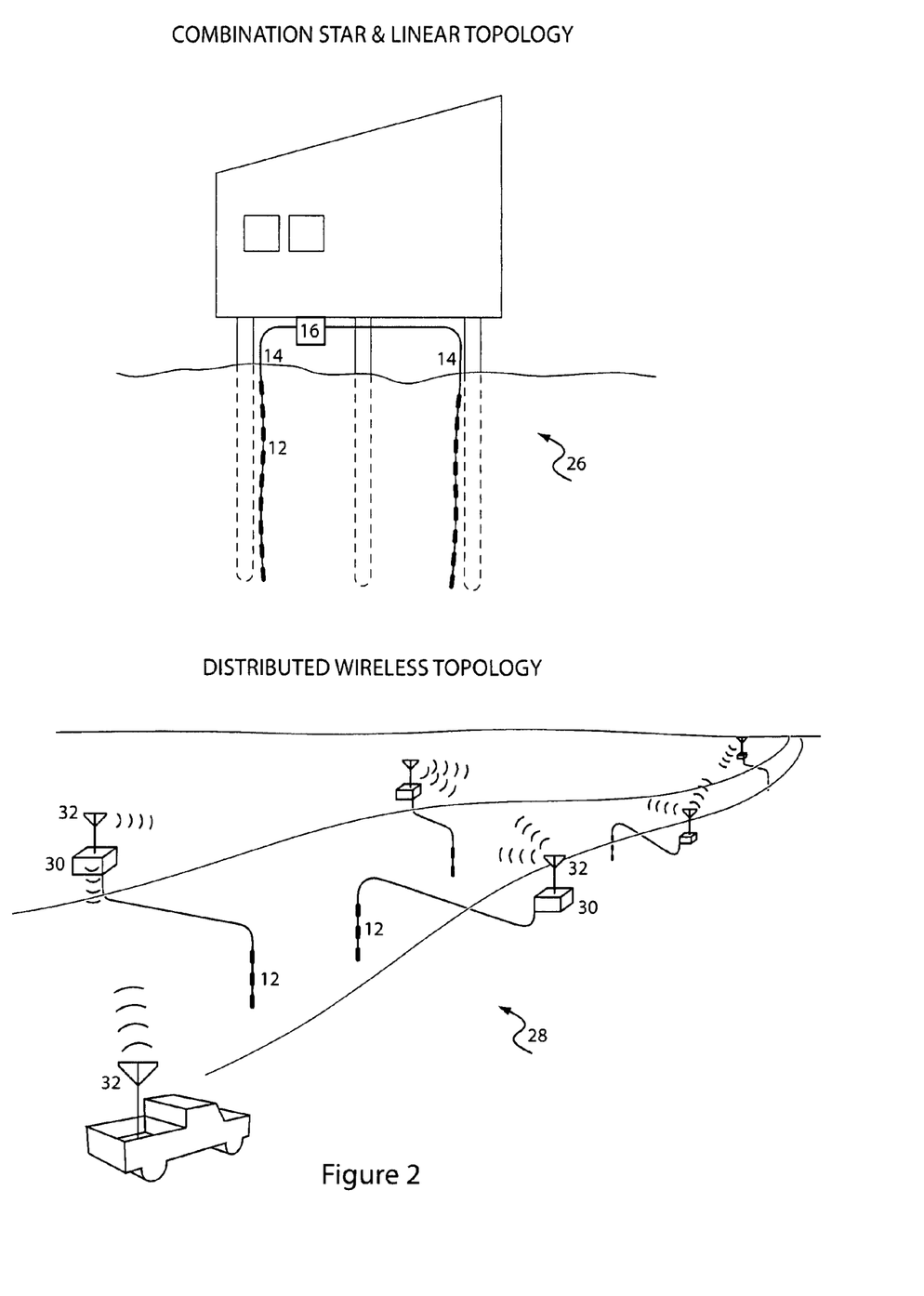
FIG. 2 depicts an alternate hard-wired network topology and a distributed wireless network topology within an arbitrary landscape in which this invention could be used.

The preferred embodiment of the invention uses the capability for the digital communications protocol to adapt to various network topologies shown in FIGS. 1 and 2 within arbitrary landscapes. The same embodiment may be used interchangeably in each topology without modification. A star topology 10 describes a plurality of sensor modules 12 arranged on multiple legs 14 of varying length extending from a control appliance 16. A linear topology 18 describes a single leg 20 starting at a control appliance 16 and extending to the farthest sensor module 22. A plurality of sensor modules 12 are attached to the leg along its length.

The preferred embodiment may also be used in a mixed topology 26 having aspects of both star 10 and linear 18 topologies including multiple legs 14 extending from a control appliance 16 and a plurality of sensor modules 12 mounted along their length. Finally, a distributed wireless network topology 28 may be used having a plurality of sensor modules 12 attached to an interface device 30 associated with a bi-directional wireless communication unit 32. A distributed network 28 may utilize wireless mesh-type intelligence to independently form associations enabling communication between individual communication units 32 which independently would have physical separation distances exceeding their range.

Figure 3:
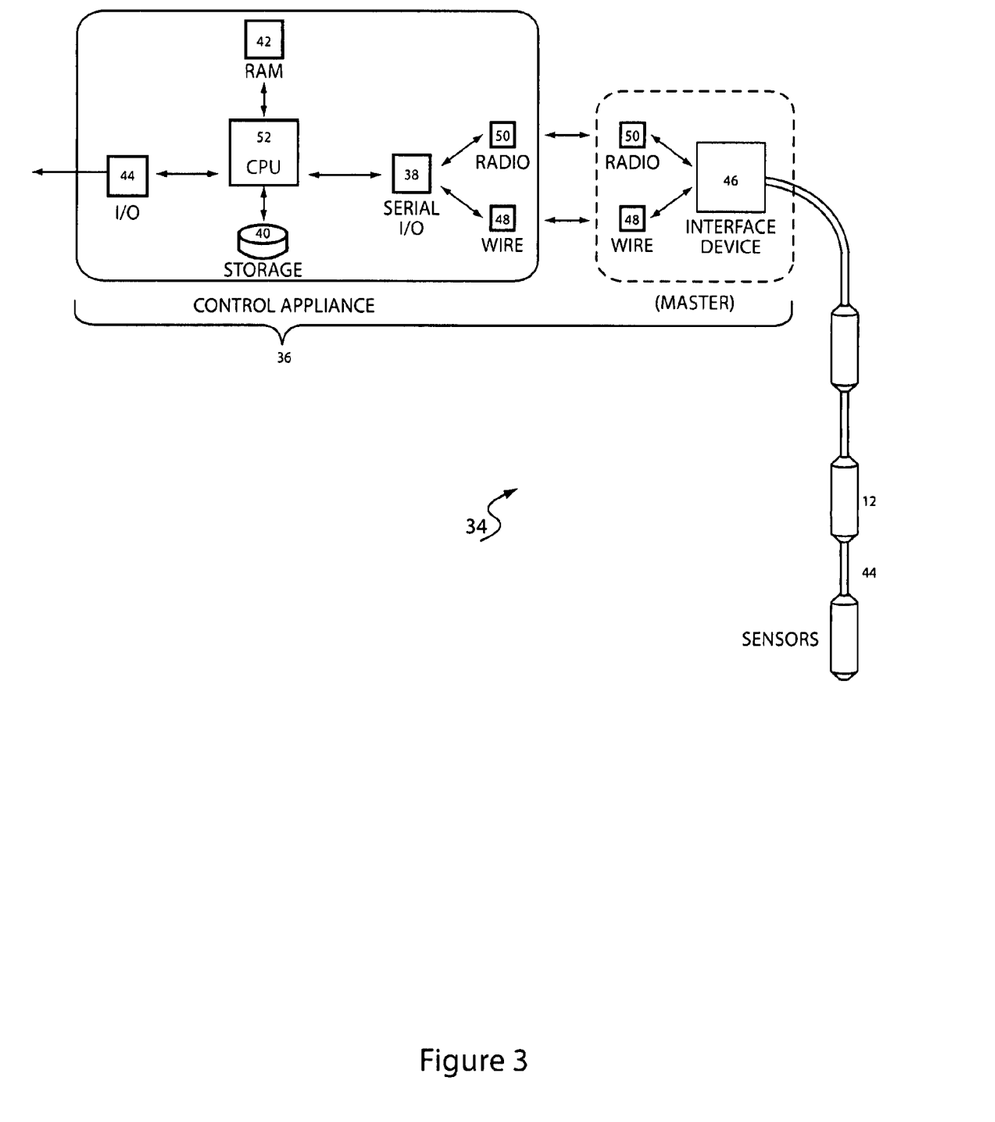
FIG. 3 is a diagrammatic view of a computer system upon which an embodiment according to the present invention can be implemented.

The preferred embodiment includes a complete temperature acquisition system 34 illustrated diagrammatically in FIG. 3. Additional functionality is achieved by a combination of integrated hardware and software resident in the control appliance 36. The control appliance 36 serves as a platform for a serial communications bus 38, data storage 40, random access memory 42, and external connectivity 44 via RS-232, USB or serial radio communication with a host device, Ethernet-type computer network, the internet or any other type of network. Low-level communication with the sensor modules 12 is accomplished by an interface device 46 as would be understood by those skilled in the art. According to the preferred embodiment, the interface device 30 communicates with the control appliance 36 via a serial communications bus 38. The serial communications bus 38 may be associated with the interface device 46 either by direct electrical connections (wired) 48 or by a suitable radio technology (wireless) 50. The communication protocol applied in the preferred embodiment is exemplary and other communication protocols can be used.

The control appliance CPU 52 supports an embedded operating system capable of running a software load that controls the embodiment of the invention, issues various commands to acquire temperature data, organizes the returned data into a database file and attempts to transmit the data externally at user defined time intervals or in response to user requests.

Figure 4:
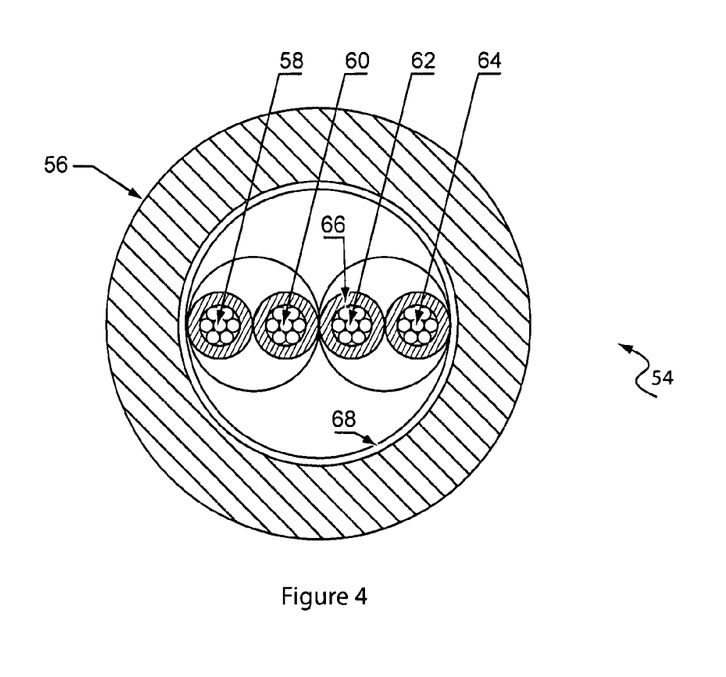
FIG. 4 depicts the signal cable in detailed cross-section.

The preferred embodiment of the invention advantageously uses the specialized signal cable 54 illustrated in FIG. 4 developed specifically to maximize mechanical reliability in extreme low temperatures (i.e. to at least −40 degrees C./F.) for prolonged periods. An outer cable jacket 56 of suitable polymeric material, typically polyurethane, provides overall mechanical protection from actions on the embodiment such as flexure, twisting, kinking, and abrasion to temperatures as low as −40 C. The cable jacket also protects the internal components from environmental contaminants and fluids such as oil and water. Four tinned copper stranded wire conductors provide bi-directional data transmission 58, data ground or reference 60, unregulated input power supply 62, and regulated power supply 64 connections to the sensors. Each conductor is insulated 66 using a suitable polymeric material, typically polypropylene. The data transmission and ground reference conductors are twisted to minimize electromagnetic interference during operation. The unregulated power supply and regulated power supply conductors are also twisted to facilitate cable manufacture. A binding wrap 68, typically Mylar, may be employed to further facilitate manufacture and improve concentricity of the conductor group and outer jacket 56.

Given the cable outer diameter as a physical constraint, the use of fewer conductors than required in the prior art permits additional annular space to be allocated to other functions such as insulation, shielding, and mechanical protection improving the performance and service life of the cable. Moreover, fewer conductors diminishes manufacturing labor requirements and its associated costs.

Figure 5:
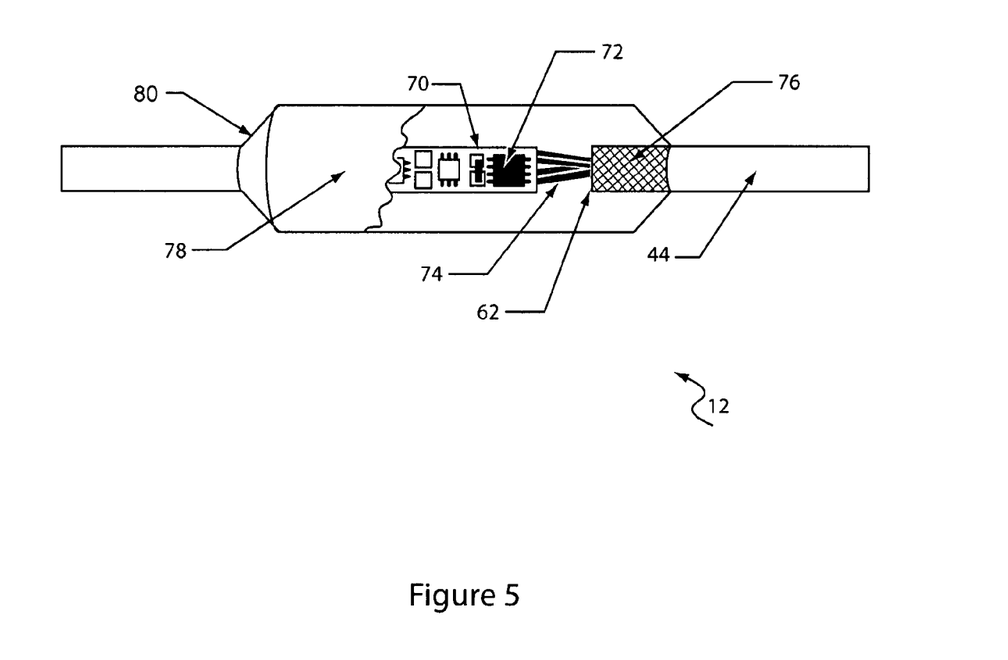
FIG. 5 is a partial cutaway view depicting embedded conductors, the sensor module, and segments of signal cable potted according to the preferred embodiment.

The signal cable 54 provides a reliable path for power supply and communication between the control appliance 36 and individual sensor modules 12. FIG. 5 shows how each sensor module 12 is housed in an assembly designed to provide robust mechanical protection and a continuous environmental seal or barrier against external particles and fluids. A printed circuit board 70 mounted with the sensor element IC 72 and other components more fully described below, signal cable conductors 74, and a short length of outer jacket at each end of the assembly 76 are potted in a suitable polymeric material 78, typically polyurethane given form by casting within a mold. The formed polymeric material 78 provides a continuous structural connection between lengths of signal cable 44 by forming a permanent chemical bond with the signal cable outer jacket 76 exposed to the polymeric material 78 inside a mold. The mold form incorporates a smooth taper 80 between the signal cable outer jacket and the outer diameter of the form for integral strain relief and to minimize the tendency for the cable to catch on sharp edges during use.

Figure 6:
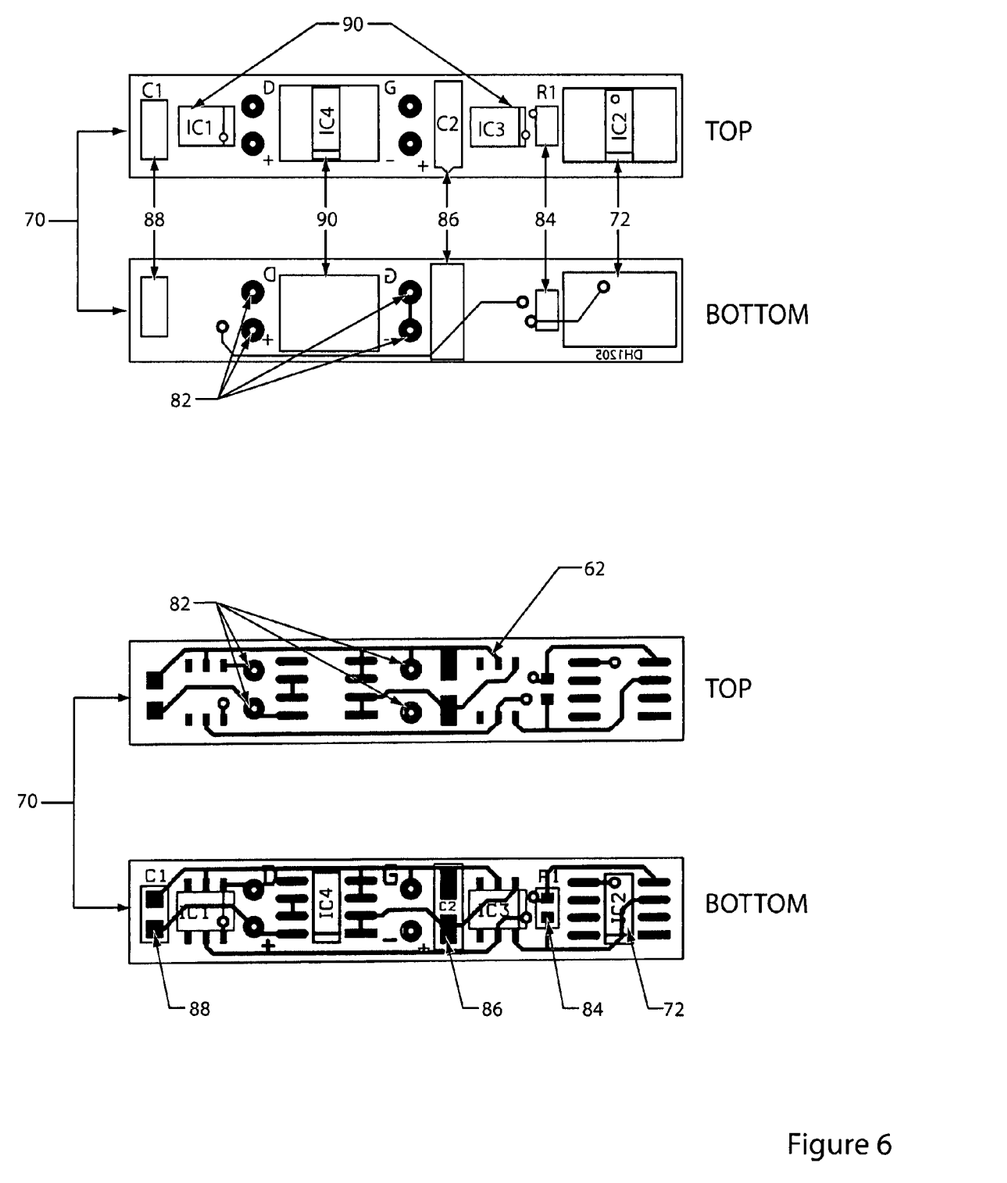
FIG. 6 depicts the printed circuit board as viewed from the top and bottom, including electronic components and integrated circuits according to the preferred embodiment.

As shown in FIG. 6, the preferred embodiment of the sensor module 12 incorporates a PCB (printed circuit board) 70 of suitable substrate material such as a woven fiberglass mat impregnated with epoxy resin to mechanically support and electrically connect the electronic components comprising the sensor module 12. The PCB 70 features through-hole contact pads 82 for permanent (soldered) electrical association with the conductors of the signal cable 54.

The components of the preferred embodiment are readily available and consist of a surface mount resistor 84, polarized capacitor 86, non-polarized capacitor 88, two electrostatic discharge protection ICs 90, a diode half-wave rectifier on chip 92. The preferred embodiment of the sensor element 72 employs a digital temperature sensor IC capable of deriving power for operation from the data transmission conductor 58 by including a capacitor on chip and advantageously utilizing a communication protocol which maintains a logic level one (voltage high) state most of the time. Alternately, the digital temperature sensor IC 72 can recognize when external power is output from a diode half-wave rectifier on chip 92 and made available to the appropriate pin on the digital temperature sensor IC 72. The digital temperature sensor IC 72 can then advantageously utilize the power for improved reliability in extreme cold temperature conditions and/or where a plurality of sensors cumulatively exert to too great a current draw for regular data transmission to continue to occur reliably.

The preferred embodiment depicted as an assembled printed circuit board 70 in FIG. 6 and as a schematic circuit diagram 94 in FIG. 7 incorporates a novel design which permits crafting very long signal cables that are immune to communications failures normally associated with bus voltage levels falling below minimums for conventional CMOS/TTL logic level one (2.2V or 2.8V). The design reserves a single conductor from the signal cable 54 for unregulated input power supply 62 which is separate from the data transmission conductor 58 that is clamped for example by the interface device 46 or control appliance 36 with an applied voltage such as +6V or +9V well in excess of the target supply voltage to the digital temperature IC 72 of +5V. The unregulated input power supply line feeds a diode half-wave rectifier on chip 92 which functions as a voltage regulator that outputs constant 5V to the appropriate pin on the digital temperature sensor IC 72.

Figure 7:
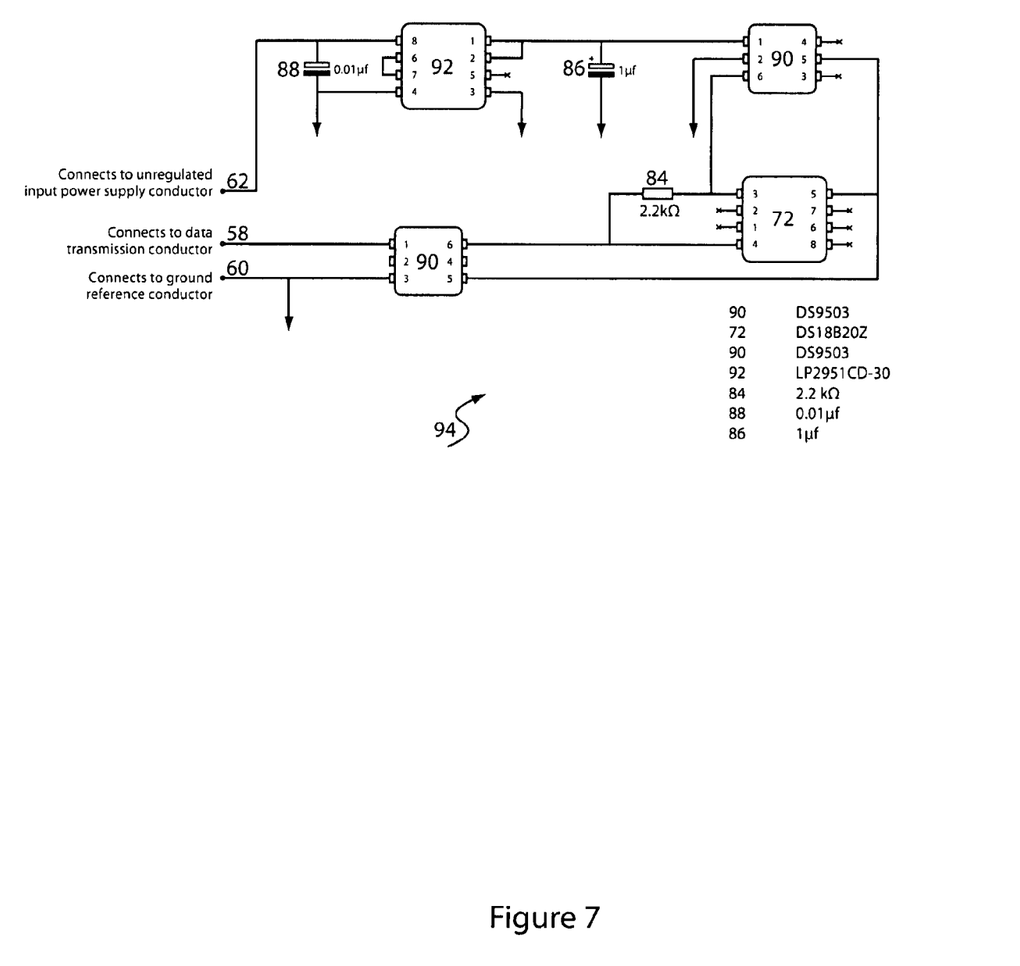
FIG. 7 is a system electrical schematic of one embodiment of the invention.

Although not depicted in the preferred embodiment of the sensor module 12 shown in FIG. 5 or printed circuit board 70 shown in FIG. 6, an alternate embodiment of the invention reserves a single conductor from the signal cable 54 for a regulated voltage power supply 64 to be carried from the output of only one voltage regulator such as the diode half-wave rectifier on chip 92 featured in FIG. 7 to a plurality of sensor elements 72 located at a distance. The ability for a plurality of sensor elements 72 to share the output from a single voltage regulator is a function of the input current available to the diode half-wave rectifier on chip 92 input pin, the output capacity of same, the demand exhibited by each individual sensor element 72 and losses associated with transmission through the conductors.

The preferred embodiment also reserves a single conductor each for bi-directional data transmission 58 and data ground or reference 60.

The stability of the supplied voltage to the digital temperature sensor IC 72 is further ensured through the use of a non-polarized capacitor 88 between the regulator input 62 and drain 96. An additional polarized capacitor 86 installed between the regulator output 98 and an electrostatic discharge prevention device 90 also serves as a redundant current stabilizer in the event of momentary power loss. An additional ESD prevention device 90 functions to isolate the digital temperature sensor IC 72 from ESD events along the data transmission 58 and reference or ground lines 60.

PCBs 70 are rugged, inexpensive, and can be highly reliable. They require much more layout effort and higher initial cost than either wire-wrapped or point-to-point constructed circuits, but are much cheaper, faster, and consistent in high volume production. Also a printed circuit board can be employed as a platform for mounting the integrated circuit-based sensor 72 and allows additional mechanical isolation from stresses arising from flexure of the signal cable 54.

The control appliance 36 supports access to the data stored in memory 40 over a public data network, such as the global Internet via a network interface card 44.

Figure 8:
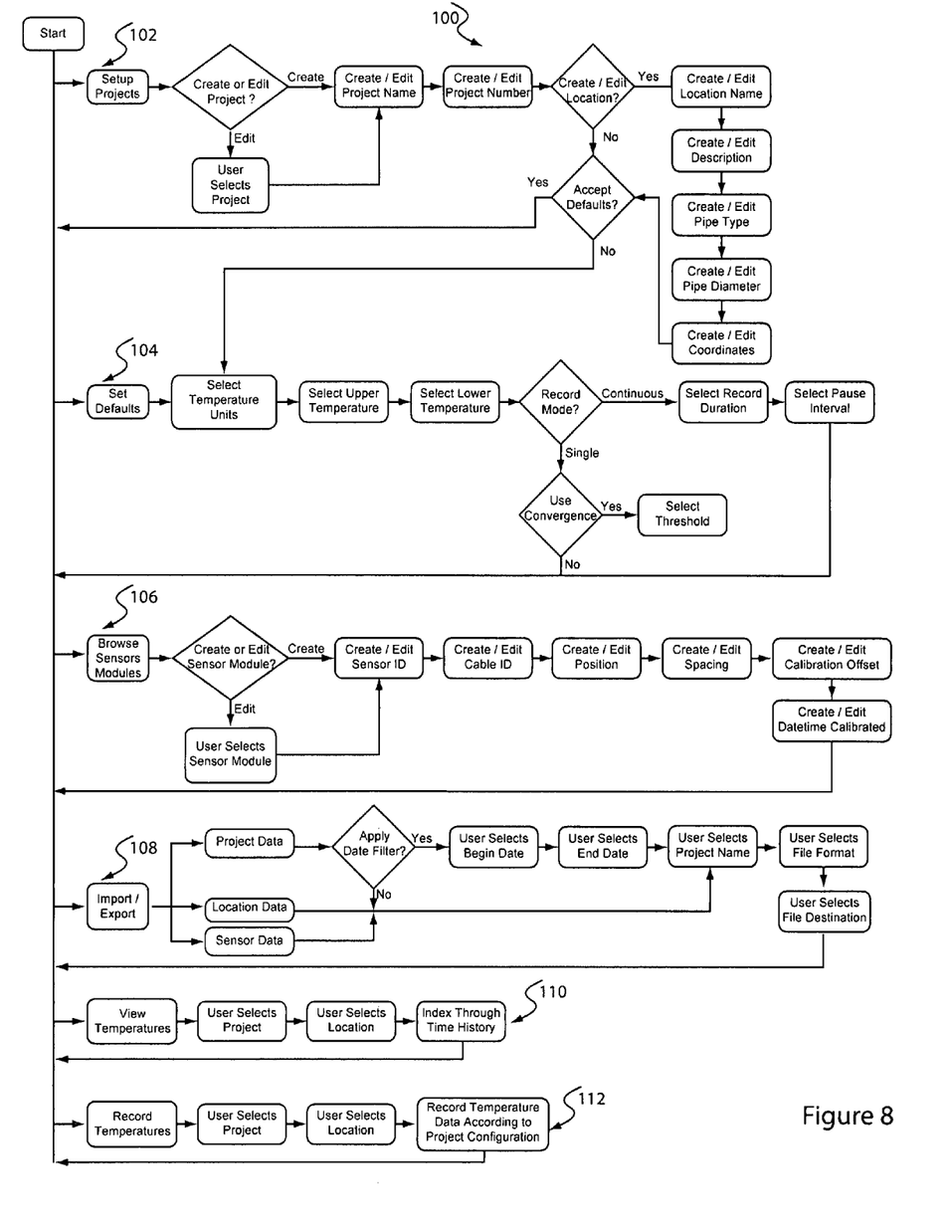
FIG. 8 is a diagrammatic flow chart of steps of an exemplary processing method in accordance with the present invention.

FIG. 8 illustrates exemplary processing details of a method 100 in accordance with the present invention. The method could be implemented as an arrangement of instructions delivered to data storage 40 within a control appliance 36 corresponding to a mobile handheld computing device.

In an initial step 102, the method provides for organization of future sensed temperature data into a database for storage and later retrieval. Incorporation of metadata associated with the time, or geographic position, local conditions, or purposes of one or many temperature readings benefits the consumer of the data. The initial step 102 is exemplary and other organizational schema may be implemented.

In a second step 104, substantial additional functionality beyond basic control and interaction with one or a plurality of sensor modules 12 is described for the control appliance 36. Generic computing platforms including a mobile handheld computing device are well suited for automation of many functions. Selection of upper and lower temperatures for comparison with sensed temperature data adds alarm capabilities. The frequency with which the control appliance acquires sensed temperature data and the duration of the recording period are described.

In a third step 106, sensor element property data specific to one or a plurality of sensor elements such as the digital temperature sensor IC 72 described, is determined and stored in a database and later applied to or combined with data as it is received from individual sensor modules to the control appliance 36, processed, and stored in a database. For instance, a constant offset value may be applied to each result received by the control appliance 36 from a sensor module 12.

In a fourth step 108, additional functionality is attributed to the control appliance 36 enabling configurable import and export operations to and from the control appliance via an input/output device 44 of various organizational data or data specific to one or a plurality of sensor elements.

In a fifth step 110, the method describes one means of selectively viewing previously acquired sensed temperature data either by project or by location or by time or by a combination of these criteria.

In a sixth step 112, the primary functionality of the multipoint digital temperature acquisition system is described. The control appliance initiates interaction with one or a plurality of sensor modules electrically associated with it and acquires sensed temperature data in accordance with the metadata determined in step 102, the frequency, duration, alarm settings, and units prescribed in step 104, and the unique sensor element property data determined in step 106.

Figure 9:
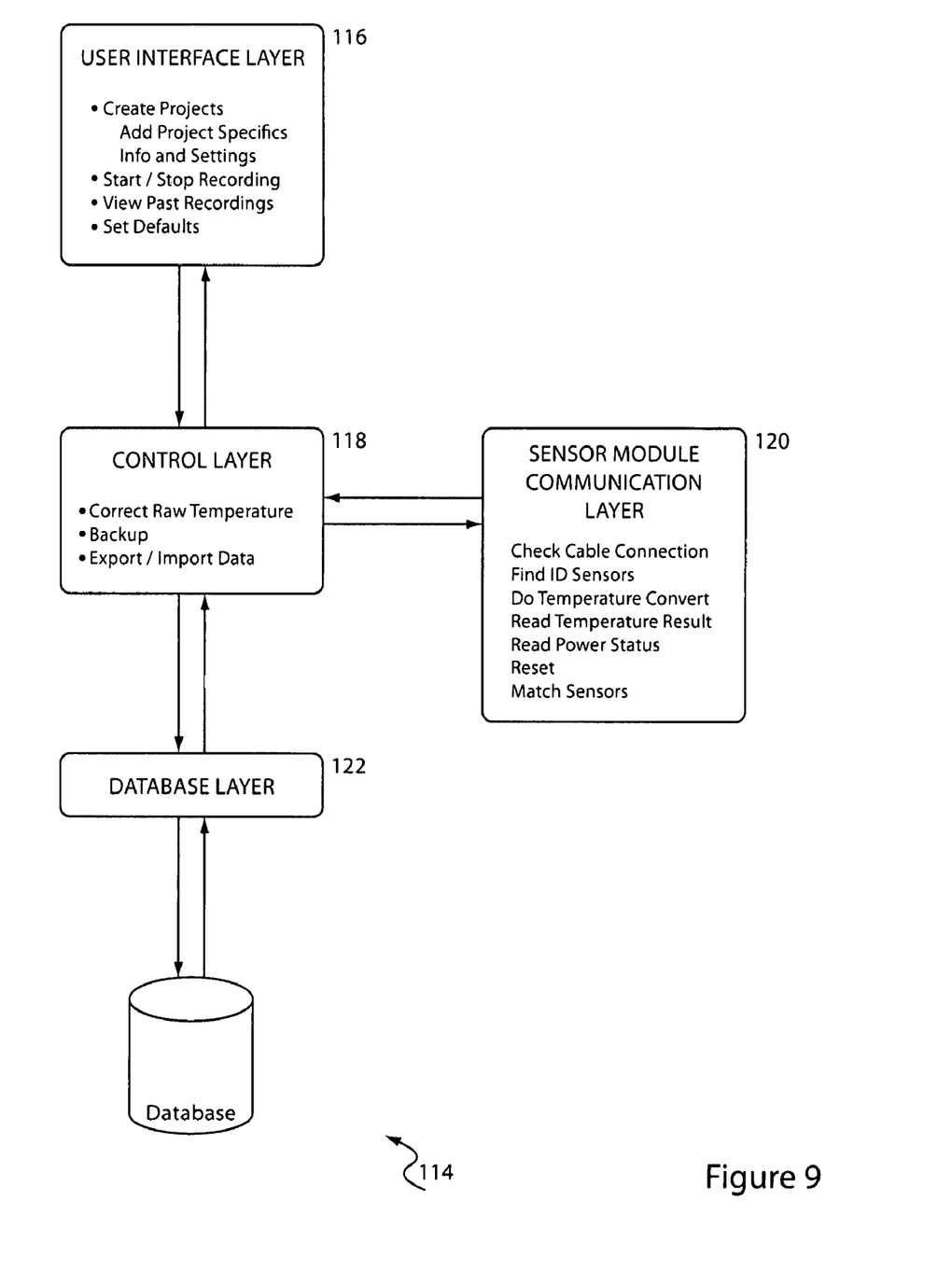
FIG. 9 is a diagram of the relationship between major layers of a software algorithm in one embodiment of the present invention.

Generalized layers of a computer program product 114 embodied on a computer-readable storage medium for substantially receiving a set of instructions for execution of method 100 by a control appliance are illustrated in FIG. 9. A computer program product or software algorithm 114 that consists of four distinct layers provides flexibility for future adaptation to alternate embodiments of the control appliance or sensor modules 12. The layers shown are the User Interface Layer 116, the Control Layer 118, the Sensor Module Communication Protocol Layer 120, and the Database Layer 122. By using separate layers that communicate with each other, the individual parts (i.e., layers) can be re-used or replaced without altering code in another layer. In addition, the layers act to modularize the computer program product 114 and allow for easy updating of components.

In another embodiment of the invention, a sensor module 12 could be wirelessly coupled to an interface device 46. Those with skill in the art will understand that a plurality of sensor modules could be coupled to the interface device 46 without departing from the spirit and scope of this application.

In yet another embodiment of the invention, data storage modules are incorporated between sensor modules and also between a sensor module and the proximal or distal ends of the cable apparatus. This embodiment, sensor modules coupled with displaced data storage modules, provides the advantage of allowing data relevant to one or a plurality of individual sensor modules to be housed within a data storage module that is physically associated with a hard-wired cable apparatus. These data can then be passed to the control appliance 36 thereby eliminating the need for the data to be known to the control appliance a priori and reducing the need for user interaction via the control appliance I/O 44. Examples of this data are cable serial number, calibration data, etc.

Embodiments of the present invention provide a novel multipoint temperature measurement cable which successfully integrates adaptations for improved life and performance in extreme low temperature field applications (i.e. to at least −40 degrees C./F.). Although the invention has been described in connection with a preferred embodiment, it should be understood that various modifications, additions and alterations may be made to the invention by one skilled in the art without departing from the spirit and scope of the invention as described herein.

The invention claimed is:

1. An apparatus comprising:
a digital environmental temperature sensing module, the module having an elongated, molded housing with first and second tapered ends for receipt of at least one multiple conductor cable, the housing carries an environmental temperature sensor which outputs a digital representation of sensed environmental temperature;
wherein each end is coupled to a multi-conductor cable;
wherein one conductor is coupled to local power supply circuitry to provide electrical energy to the sensing module, a second conductor carries temperature information, and a third conductor is coupled to a local ground reference; and
wherein the local power supply circuitry comprises voltage regulator circuitry, the regulator circuitry provides a selected output voltage to the temperature sensor.

2. An apparatus as in claim 1 wherein the housing includes interface circuits coupled between the sensor and each cable, the interface circuits carry out bidirectional communication with a displaced unit comprising a control appliance.

3. An apparatus as in claim 1 wherein the regulator circuitry reduces an input voltage, from the one conductor to a lower voltage for use by the temperature sensor.

4. An apparatus as in claim 1 further comprising an energy storage element coupled to an output port of the regulator circuitry.

5. An apparatus as in claim 1 which optionally may utilize a fourth conductor to couple an output port of the regulator circuitry to electrical energy input ports of a plurality of sensor modules spaced apart from one another by multiple conductor cables.

6. An apparatus as in claim 1 wherein the ends are sealed to and attached to a respective cable.

7. An apparatus as in claim 6 wherein the sealing and attachment between the housing and respective cables maintains a seal, flexibility and attachment at low temperatures (i.e. to at least −40 degrees C./F.).

8. An apparatus as in claim 1 wherein the temperature sensor and the regulator circuit are carried in the housing by a printed circuit board of a selected length and width.

9. An apparatus as in claim 8 wherein an input set of cable conductors is coupled to the circuit board and an output set of cable conductors is coupled to the circuit board.

10. An apparatus as in claim 1 further comprising a plurality of sensor modules spaced apart from one another by multiple conductor cables.

11. An apparatus as in claim 10 wherein one end of a cable is coupled to a displaced monitoring and control unit.

\* \* \* \* \*